United States Patent
Geissler et al.

(10) Patent No.: US 9,717,365 B2
(45) Date of Patent: Aug. 1, 2017

(54) PUMP COFFEE BREWER

(71) Applicant: National Presto Industries, Inc., Eau Claire, WI (US)

(72) Inventors: Richard L. Geissler, Chippewa Falls, WI (US); Justun C. Seymour, Eau Claire, WI (US); Michael R. Berge, Eau Claire, WI (US)

(73) Assignee: National Presto Industries, Inc., Eau Claire, WI (US)

( * ) Notice: Subject to any disclaimer, the term of this patent is extended or adjusted under 35 U.S.C. 154(b) by 500 days.

(21) Appl. No.: 13/711,245

(22) Filed: Dec. 11, 2012

(65) Prior Publication Data

US 2013/0101715 A1     Apr. 25, 2013

Related U.S. Application Data

(63) Continuation-in-part of application No. 13/158,673, filed on Jun. 13, 2011.

(51) Int. Cl.
*A47J 31/44*     (2006.01)
*A47J 31/36*     (2006.01)
(Continued)

(52) U.S. Cl.
CPC .......... *A47J 31/3676* (2013.01); *A47J 31/32* (2013.01); *A47J 31/38* (2013.01)

(58) Field of Classification Search
CPC   A47J 31/24; A47J 31/02; A47J 31/053; A47J 31/0689; A47J 31/057; A47J 31/34;
(Continued)

(56) References Cited

U.S. PATENT DOCUMENTS

D43,792 S    4/1913  Swan
D65,078 S    7/1924  Pressley
(Continued)

FOREIGN PATENT DOCUMENTS

WO    WO 2011004269 A1 *  1/2011

OTHER PUBLICATIONS

"How the Clover Coffee Maker Works," http://electronics.howstuffworks.com/gadgets/kitchen/clover-coffee-maker.htm/printable, printed Mar. 15, 2010, 8 pages.
(Continued)

*Primary Examiner* — Quang D Thanh
*Assistant Examiner* — Brandon Harvey
(74) *Attorney, Agent, or Firm* — Patterson Thuente Pedersen, P.A.

(57) ABSTRACT

Apparatus and related methods for brewing or making individual servings of a brewed beverage with a manual pump brewer. The manual pump brewer can include a pump assembly and a brew chamber assembly, whereby user manipulation of the pump assembly directs a heated liquid through a brewing media to form a serving of a freshly brewed beverage. The manual pump brewer can include a filter assembly for directly brewing a beverage from a brewing media provided by a user. Alternatively, the manual pump brewer can receive individual pods having a single serving of a brewing media such that the pump assembly directs the heated liquid through the individual pod to brew each serving of the brewed beverage.

18 Claims, 17 Drawing Sheets

(51) Int. Cl.
*A47J 31/32* (2006.01)
*A47J 31/38* (2006.01)

(58) Field of Classification Search
CPC ........ A47J 31/36; A47J 31/3666; A47J 31/38; A47J 31/46–31/467
USPC .... 99/287, 302 FB, 289 R, 295, 302 R, 290; 426/433, 77–84; 417/480
See application file for complete search history.

(56) References Cited

U.S. PATENT DOCUMENTS

| | | | |
|---|---|---|---|
| D91,797 S | 3/1934 | Barrett | |
| D132,428 S | 5/1942 | Karstadt | |
| D139,219 S | 10/1944 | Wolcott | |
| D157,588 S | 3/1950 | Gunther | |
| 2,846,939 A * | 8/1958 | Sauret Ponsa | 99/302 FB |
| D191,590 S | 10/1961 | Schlumbohm | |
| D196,807 S | 11/1963 | Carveth | |
| 3,120,170 A * | 2/1964 | Garte | 99/287 |
| D204,786 S | 5/1966 | Rawald | |
| 4,158,329 A * | 6/1979 | McKnight | 99/295 |
| 4,174,659 A | 11/1979 | Pugliese et al. | |
| 4,211,156 A | 7/1980 | Zimmermann | |
| 4,306,492 A | 12/1981 | Zimmermann | |
| 4,446,158 A * | 5/1984 | English et al. | 426/79 |
| 4,465,697 A | 8/1984 | Brice et al. | |
| 4,577,080 A * | 3/1986 | Grossman | 219/689 |
| 4,756,915 A * | 7/1988 | Dobry | 426/234 |
| 4,759,275 A | 7/1988 | Lee | |
| 4,806,369 A | 2/1989 | Thompson | |
| 5,010,221 A * | 4/1991 | Grossman et al. | 219/689 |
| 5,526,733 A * | 6/1996 | Klawuhn et al. | 99/287 |
| 5,632,193 A | 5/1997 | Shen | |
| 5,826,493 A | 10/1998 | Tien Lin | |
| 5,862,739 A * | 1/1999 | Lin | 99/285 |
| 5,880,441 A | 3/1999 | Hartman et al. | |
| 5,887,511 A * | 3/1999 | Cappellotto | 99/287 |
| 5,942,143 A | 8/1999 | Hartman et al. | |
| 5,943,946 A | 8/1999 | Chen | |
| 6,327,965 B1 | 12/2001 | Lin Tien | |
| 6,561,080 B1 | 5/2003 | Feeney | |
| 6,740,345 B2 * | 5/2004 | Cai | A47J 31/14 426/112 |
| 6,810,789 B2 | 11/2004 | Chung et al. | |
| 6,948,420 B2 * | 9/2005 | Kirschner et al. | 99/295 |
| 7,032,507 B2 | 4/2006 | Cai | |
| D557,977 S | 12/2007 | Neace et al. | |
| 7,412,921 B2 | 8/2008 | Hu et al. | |
| D606,805 S | 12/2009 | Neace et al. | |
| D611,754 S | 3/2010 | Bodum | |
| 7,673,555 B2 | 3/2010 | Nosler et al. | |
| 2006/0169150 A1* | 8/2006 | Voss et al. | 99/295 |
| 2006/0174769 A1* | 8/2006 | Favre et al. | 99/275 |
| 2009/0199721 A1 | 8/2009 | Hausslein | |
| 2009/0269229 A1* | 10/2009 | Yeo | 417/480 |
| 2011/0215085 A1 | 9/2011 | Garvey et al. | |
| 2012/0260806 A1 | 10/2012 | Rolfes et al. | |
| 2012/0312173 A1 | 12/2012 | Geissler et al. | |
| 2014/0072684 A1* | 3/2014 | Madden | 426/431 |

OTHER PUBLICATIONS

Application and File history for U.S. Appl. No. 13/158,673, filed Jun. 13, 2011. Inventors: Geissler et al.

* cited by examiner

PUMP COFFEE BREWER

PRIORITY CLAIM

The present application is a Continuation-In-Part Application of U.S. patent application Ser. No. 13/158,673 filed Jun. 13, 2011, and entitled "PUMP COFFEE BREWER", which is herein incorporated by reference in its entirety.

FIELD OF THE INVENTION

The present invention is directed to the field of coffee makers and related methods of brewing coffee. More specifically, the present invention is directed to a coffee maker including a brew chamber having a deformable pump assembly for pressurizing water used in brewing coffee.

BACKGROUND OF THE INVENTION

Coffee is a brewed beverage formed by passing heated water through roasted coffee beans and is one of the most widely consumed beverages in the world. A wide variety of methods and related brewing apparatus exist to brew coffee and are selected by consumers based upon their particular characteristics including ease of brewing, amounts to be brewed and strength/taste of the brewed coffee. When brewing multiple cups or other large volumes, it is common to use equipment utilizing drip or percolating techniques. While percolating or drip style equipment is extremely popular, many coffee aficionados prefer the taste of coffee wherein the servings are individually prepared immediately prior to consumption.

One popular technique for brewing individual servings of coffee is through the utilization of a French Press. The French Press generally consists of a cylindrical chamber into which coffee grounds and heated water are added. A lid is placed over the chamber and a plunger directs a permanent filter downward and through the chamber to physically separate spent coffee grounds from the now freshly brewed coffee. Brewed coffee prepared with a French Press is generally stronger, thicker and includes more sediment than coffee prepared with traditional drip or percolating brewers. It would be advantageous to further improved upon the French press design to provide similar ease of preparation with individual servings while also providing for sediment removal in line with that provided by traditional drip and percolating brew methods.

A more recent development in the area of single cup brewing techniques has been to utilize individual pods capable of brewing individual servings. These pods can include prepackaged pods, such as, for example, K-Cups® available from Green Mountain Coffee Roasters of Waterbury, Vt. or reusable/refillable pods such as those available from Solofill, LLC of Houston, Tex. Generally, these pods are utilized in self-contained machines sold under brand names such as, for example, Keurig® and Mr. Coffee® and are generally capable of performing various brewing operations including heating water, pressurizing the heated water and directing the heated water into and out of the individual pods for brewing individual servings at the touch of a button and as a user waits. In addition to these self-contained machines, a hand-operated version requiring additional user intervention is available as the My French-Press® from Cafejo® of Santa Ana, Calif. and is described in U.S. Patent Publication No. 2012/0260806A1.

SUMMARY OF THE INVENTION

Embodiments of the present disclosure relate to a pump coffee brewer for brewing individual servings of coffee. More specifically, representative embodiments of the pump coffee brewer include a pump assembly and a brew chamber assembly, whereby user manipulation of the pump assembly directs heated water through ground coffee to form freshly brewed coffee. In some embodiments, the pump coffee brewer can further comprise a filter assembly for directly brewing coffee from ground coffee. In another alternative embodiment, the pump coffee brewer can receive prepackaged, individual pods of ground coffee such that the pump assembly directs heated water through the individual pod to brew each serving of coffee. In some embodiments, the pump coffee brewer can physically interface with a coffee mug for receiving the freshly brewed coffee while in some alternative embodiments, a discharge assembly can be incorporated for filling the coffee mug. The embodiments of the pump coffee brewer all provide a coffee consumer the ability to generate individual servings of freshly brewed coffee on demand.

In one representative embodiment, a brew chamber assembly can comprise a pump assembly, a brew chamber assembly and a filter assembly. The pump assembly can comprise a deformable exterior wall for manually generating pressure within the brew chamber assembly. The pump assembly can comprise an air flow valve to relieve any vacuum formed within the brew chamber assembly as heated water within the brew chamber assembly begins to cool. The filtration assembly can comprise a filtration disc, a coarse filter and a disposable fine filter allowing freshly brewed coffee to be separated from ground coffee and to allow the ground coffee to be subsequently removed from the brew chamber assembly and discarded. The brew chamber assembly can include a pressure plate for directly engaging an upper surface of a coffee mug so as to provide resistance for preventing a shut off valve from opening until the consumer applies pressure with the pump assembly, thereby directly filling the coffee mug with the freshly brewed coffee.

In another representative embodiment, a brew chamber assembly can comprise a pump assembly, a brew chamber assembly and a filter assembly. The pump assembly can comprise a deformable exterior wall for generating pressure within the brew chamber assembly. The pump assembly can comprise an air flow valve to relieve any vacuum formed within the brew chamber assembly as heated water within the brew chamber assembly begins to cool. The filtration assembly can comprise a filtration disc, a coarse filter and a disposable fine filter allowing freshly brewed coffee to be separated from ground coffee and to allow the ground coffee to be subsequently removed from the brew chamber assembly and discarded. The brew chamber assembly can include a discharge portion for dispensing the freshly brewed coffee to a coffee mug through a discharge spout when the consumer applies pressure with the pump assembly.

In yet another representative embodiment, a method for brewing coffee can comprise placing a filtration assembly within a brew chamber assembly. The method can further comprise placing ground coffee on the filtration assembly and filling the brew chamber assembly with heated water. With the ground coffee and heated water within the brew chamber assembly, the method can further comprise mounting a pump assembly over a chamber opening of the brew chamber assembly. After the ground coffee has steeped within the heated water for a desired amount of time, the method can further comprise applying pressure to the brew chamber assembly with the pump assembly to separate freshly brewed coffee from the coffee grounds. The method can further comprise dispensing the freshly brewed coffee into a coffee mug. In some embodiments, dispensing the freshly brewed coffee can comprise directly dispensing the freshly brewed coffee into the coffee mug or alternatively, utilizing a discharge assembly to dispense the freshly brewed coffee through a discharge spout. The method can further comprise removing the filtration assembly and disposing of the spent ground coffee and the disposable fine filter.

In another representative embodiment, a brew chamber assembly can comprise a pump assembly and a brew chamber assembly that is adapted to receive and interface with an individual pod containing ground coffee or other brewing medias such as, for example, hot chocolate or tea. The individual pods can comprise a pre-packaged pod or alternatively, the pod can comprise a reusable/refillable pod design. The pump assembly can comprise a deformable exterior wall for manually generating pressure within the brew chamber assembly. The pump assembly can comprise an air flow valve to relieve any vacuum formed within the brew chamber assembly as heated water within the brew chamber assembly begins to cool. A base assembly can define a pod receiving cavity for receiving the individual pod. The brew chamber assembly can include a downward facing cone for delivering a liquid into the individual pod, for example, by piercing an upper foil surface of a prepackaged pod or by entering an interior portion of a reusable/refillable pod as the brew chamber assembly is attached to the base assembly. The base assembly can include a central aperture in fluid communication with the pod receiving cavity. In the case of a prepackaged pod, a hollow pin can be positioned within the central aperture such that the hollow pin pierces a pod bottom surface when the prepackaged pod is positioned within the pod receiving cavity. The base assembly can comprise a lower base surface for interfacing with a cup such as, for example, a coffee mug such that a brewed beverage is dispensed through the central aperture and into the coffee mug.

In yet another representative embodiment, a method for brewing or making a beverage can comprise deforming a manual pump assembly such that water is directed through an individual pod containing a brewing media such as, for example, ground coffee, hot chocolate powder or tea leaves. The method can further comprise positioning the individual pod within a pod receiving cavity on a base assembly and attaching the base assembly to a brew chamber assembly. In the case of a prepackaged pod, the method can further comprise piercing an upper foil surface on the prepackaged pod within a downward facing cone on the brew chamber assembly. The method can further comprise piercing a pod bottom surface of the prepackaged pod with a pin mounted in a central aperture on the base assembly. The method can further comprise dispensing a brewed beverage into a cup such as, for example, a coffee mug through the central aperture. The method can further comprise filling the brew chamber with water and placing the filled brew chamber assembly in a microwave oven to heat the water.

The above summary of the various representative embodiments of the invention is not intended to describe each illustrated embodiment or every implementation of the invention. Rather, the embodiments are chosen and described so that others skilled in the art may appreciate and understand the principles and practices of the invention. The figures in the detailed description that follows more particularly exemplify these embodiments.

BRIEF DESCRIPTION OF THE FIGURES

The invention may be more completely understood in consideration of the following detailed description of various embodiments of the invention in connection with the accompanying drawings, in which.

Figure 1:
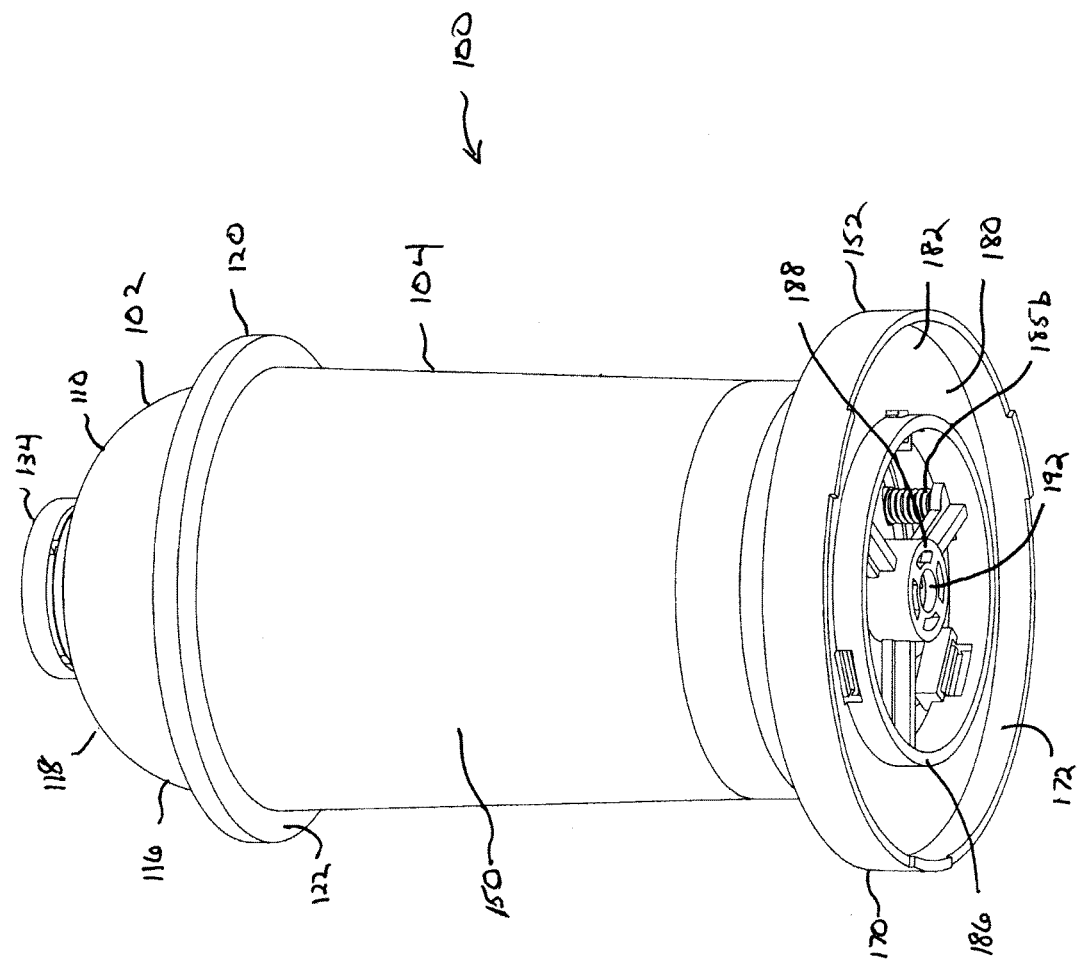
FIG. 1 is a front, lower perspective view of a pump coffee brewer according to an embodiment of the present invention.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives.

DETAILED DESCRIPTION OF THE FIGURES

Figure 2:
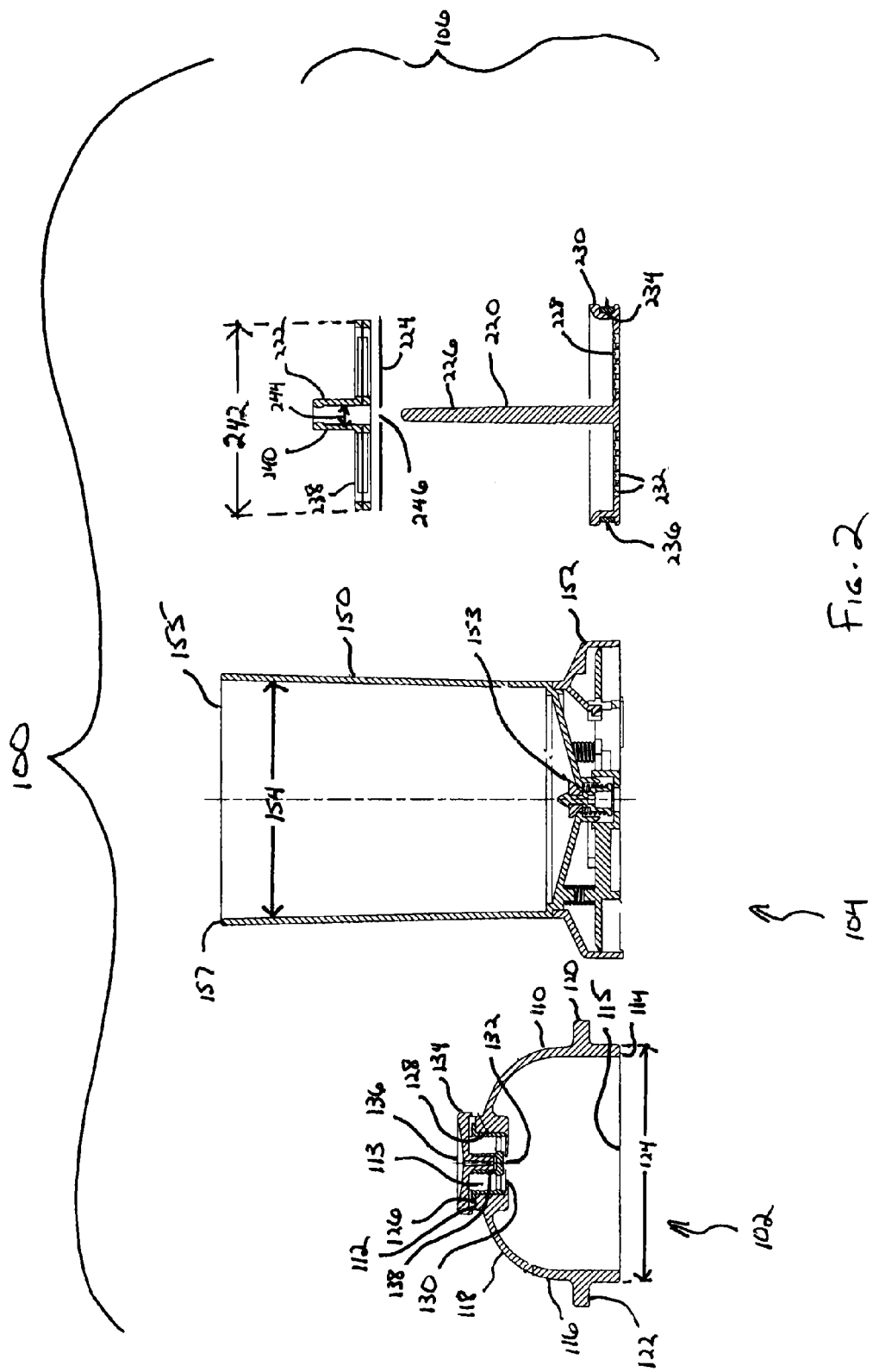
FIG. 2 is a front, exploded, section view of the pump coffee brewer of FIG. 1.

As illustrated in FIGS. 1 and 2, a representative embodiment of a pump coffee brewer 100 can comprise a pump assembly 102, a brew chamber assembly 104 and a filtration assembly 106. Pump coffee brewer 100 is generally fabricated of materials compatible with elevated temperatures associated with brewing hot coffee as well as cleaning and sanitizing following the coffee brewing process. Brew chamber assembly 104 and filtration assembly 106 can comprise materials of construction suitable for food contact and compatible with conventional dishwashing methods such as, for example, plastics such as polycarbonate and polyethylene and/or metals such as stainless steel.

Referring to FIGS. 1 and 2, pump assembly 102 generally comprises an exterior wall 110 having an upper surface 112 defining an upper opening 113 and a lower surface 114 defining a lower opening 115. Exterior wall 110 generally has a spherical perimeter 116 including a domed region 118 defined as the exterior wall 110 transitions into the upper surface 112. Exterior wall 110, and more specifically, domed region 118 is generally formed of a resilient, deformable material such as rubber or other materials suitable for food contact and compatible with conventional dishwashing methods. Proximate the lower surface 114, exterior wall 110 includes a projecting ledge 120 defining a flanged stop surface 122. At lower surface 114, pump assembly 102 has a lower surface diameter 124 measured between outer portions of opposed sides of the exterior wall 110. Upper opening 113 has an upper flanged surface 126, an inner wall 128, and an inner surface 130 that includes a valve opening 132. Pump assembly 102 further includes an air flow valve 134 having an upper stop member 136 and a central projecting member 138. Central projecting member 138 generally is sized to have a diameter larger than the valve opening 132.

Figure 3:
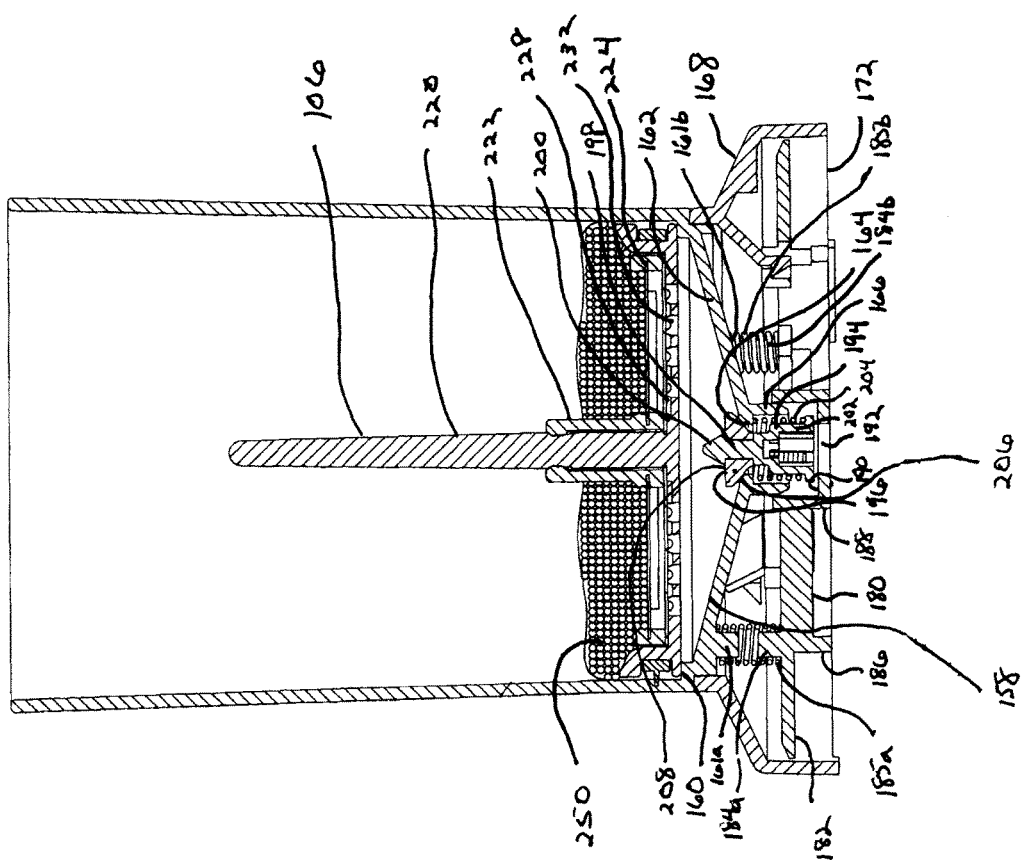
FIG. 3 is a front, section view of a brew chamber assembly with ground coffee added to the brew chamber assembly.

Referring to FIGS. 1, 2 and 3, brew chamber assembly 104 generally comprises a cylindrical body portion 150, an interface portion 152 and a shut off valve 153. Cylindrical body portion 150 defines a chamber opening 155 defined at a top body surface 157 and includes an inner diameter 154 that is only slightly larger than the lower surface diameter 124. Cylindrical body portion 150 includes a lower engagement surface 158 having an internal perimeter flange 160, three lower mounting posts, two of three shown as 161a and 161b, and a tapered lower surface 162. Tapered lower surface 162 defines a lower valve opening 164 and a projecting wall 166. Interface portion 152 attaches to the cylindrical body portion 150 and includes a transition portion 168 and a perimeter wall 170 that defines an engagement opening 172. Brew chamber assembly 104 further comprises a pressure plate 180 positioned within the engagement opening 172. Pressure plate 180 includes an end surface 182, three upper mounting posts, two of three shown as 184a and 184b, a lower divider wall 186, a plate wall 188 and a plate flanged surface 190 defining a central opening 192. Three plate springs, two of three shown as 185a and 185b are mounted over the upper mounting posts, 184a and 184b and lower mounting posts, 161a and 161b. Shut off valve 153 includes a valve member 194 and a sealing member 196. Valve member 194 includes a valve stem 198 having a valve projection 200 and an actuation body 202. A valve spring 204 mounts around the actuation body 202. Sealing member 196 generally comprises a compliant sealing material defining a tapered sealing surface 206 and a retention surface 208. Tapered sealing surface 206 has a diameter exceeding the diameter of the lower valve opening 164. Sealing member 196 generally mounts over valve projection 200 and is retained on the valve stem 198.

As illustrated in FIGS. 2 and 3, filtration assembly 106 generally comprises a filtration disk 220, a coarse filter 222 and a fine filter 224. Filtration disc 220 includes a central mounting post 226, a disk floor surface 228 and a perimeter wall 230. Disk floor surface 228 includes a plurality of apertures 232 extending through the disk floor surface 228. Perimeter wall 230 includes an external sealing channel 234 for accommodating a filtration gasket 236. Coarse filter 222 includes a coarse filter surface 238 and a hollow projection 240. Coarse filter surface 238 has a coarse filter diameter 242 that accommodates the positioning of the coarse filter surface 238 within perimeter wall 230. Hollow projection 240 has an internal diameter 244 allowing the coarse filter 222 to be positioned over the central mounting post 226. Fine filter 224 generally comprises a disposable filter with a generally flat profile having a fine filter diameter equivalent to the coarse filter diameter 242 and a fine filter aperture 246.

To assemble pump coffee brewer 100, fine filter 224 is first positioned such that fine filter aperture 246 slides over the central mounting post 226 as shown in FIGS. 2 and 3. Fine filter 224 is advanced down the central mounting post 226 until the fine filter 224 rests upon the disc floor surface 228. Next, the coarse filter 222 is positioned such that the hollow projection 240 can be placed over the central mounting post 226. The coarse filter 222 is advanced down the central mounting post 226 until the coarse filter surface 238 rests upon the fine filter 224.

Once filtration assembly 106 is assembled, the filtration assembly 106 is positioned within the cylindrical body portion 150 as illustrated in FIG. 3. Filtration disc 220 is advanced into the chamber opening 155 until disc floor surface 228 is in contact with and rests against the internal perimeter flange 160. Perimeter wall 230 is only slightly undersized with respect to the inner diameter 154 such that filtration gasket 236 forms a liquid tight seal between the filtration assembly 106 and the cylindrical body portion 150.

Figure 5:
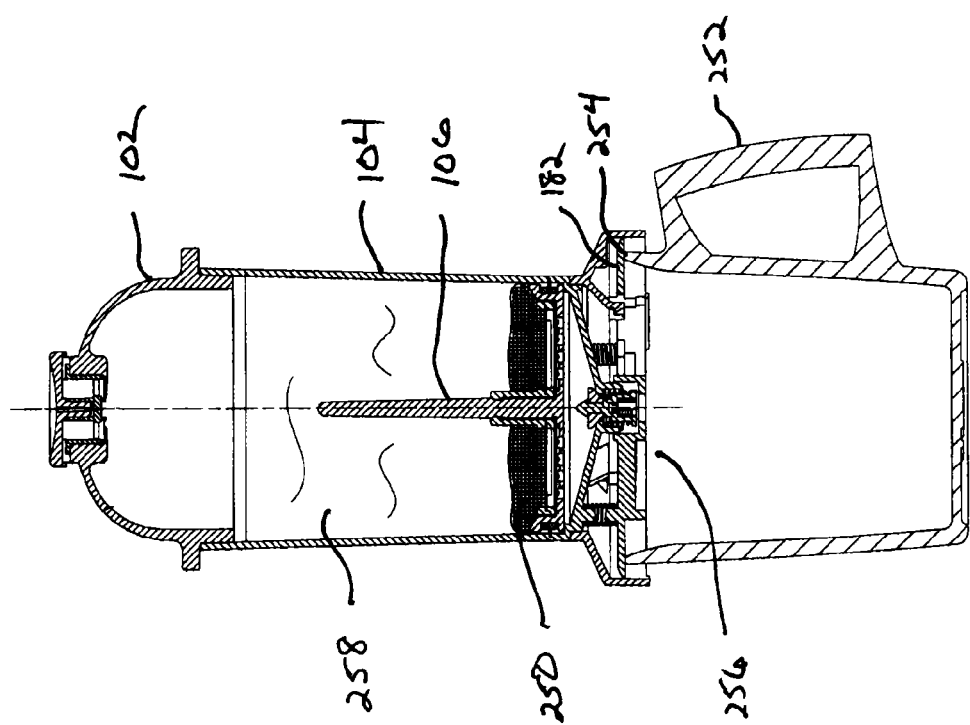
FIG. 5 is a front, section view of the pump coffee brewer of FIG. 1 attached to a coffee mug with hot water steeping for a preselected time.

Once the filtration assembly 106 is installed within the cylindrical body portion 150, the pump assembly 102 is attached to the cylindrical body portion 150 as shown in FIG. 5. Pump assembly 102 is oriented such that the lower surface 114 is inserted into the cylindrical body portion 150 until the flanged stop surface 122 contacts the cylindrical body portion 150 and prevents further insertion of the lower surface 114.

Figure 4:
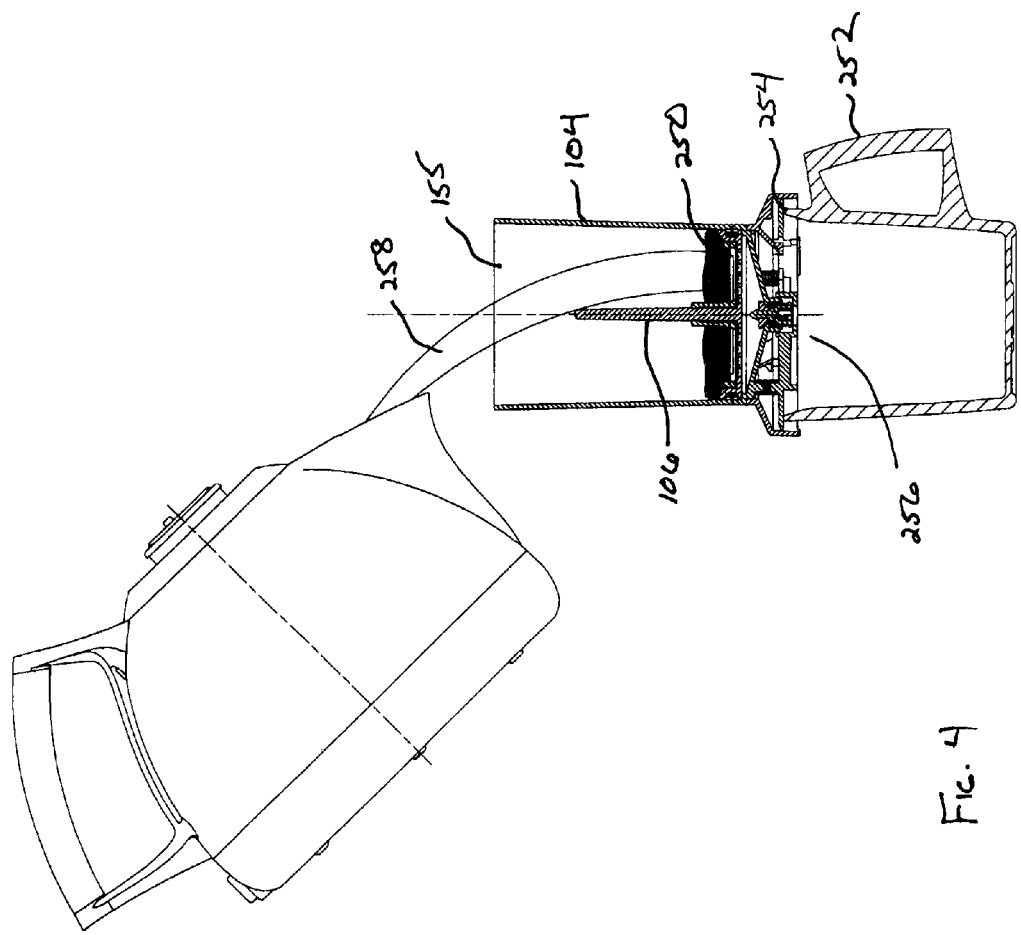
FIG. 4 is a front, section view of a brew chamber assembly attached to a coffee mug with hot water being added to the brew chamber assembly.

In use, the filtration assembly 106 is positioned with the brew chamber assembly 104 such that ground coffee 250 can be added through the chamber opening 155 as illustrated in FIG. 3. The seal created between the filtration gasket 236 and the cylindrical body portion 150 prevents any of the ground coffee 250 from bypassing the filtration assembly 106 and reaching the tapered lower surface 162. With the ground coffee 250 in the brew chamber assembly 104, the brew chamber assembly 104 can be positioned over a coffee mug 252 as shown in FIG. 4. An upper mug surface 254 is in direct contact with the end surface 182 such that central opening 192 is positioned in a mug opening 256. Next, hot water 258 that has been preheated to a desired temperature is poured directly into the chamber opening 155 such that the hot water 258 can begin steeping the ground coffee 250. Once the hot water 258 has been added, the pump assembly 102 is attached to the brew chamber assembly 104 by inserting the lower surface 114 into the chamber opening 155 as shown in FIG. 5. Lower surface 114 is fully inserted into chamber opening 155 until flanged stop surface 122 engages top body surface 157. Pressure plate 180 is held in a downward position as the combined weight of the pump assembly 102, brew chamber assembly 104, filtration assembly 106, ground coffee 250 and hot water 258 is insufficient to overcome the spring forces of the three plate springs, two of three shown as 185a and 185b. With the pressure plate 180 in the downward position, shut off valve 153 remains closed as no pressure is applied to the valve spring 204.

With the pump assembly 102 attached to the brew chamber assembly 104, ground coffee 250 steeps within the hot water 258 for a desired amount of time. By fully enclosing the hot water 258 within the brew chamber assembly 104, heat loss from the hot water 258 to the ambient atmosphere is minimized. As the hot water 258 begins to cool, a slight vacuum condition forms above hot water 258. As this vacuum condition is formed, inner surface 130 is deflected inwardly toward the hot water 258 to vent the pump assembly 102 to the ambient atmosphere and neutralize this vacuum condition.

Figure 6:
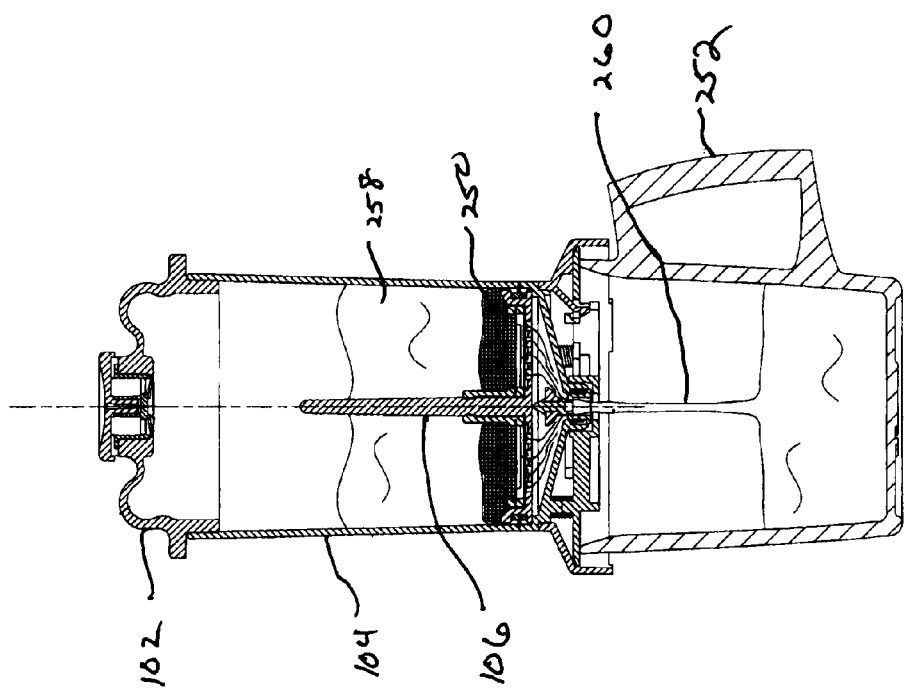
FIG. 6 is a front, section view of the pump coffee brewer of FIG. 1 attached to a coffee mug with brewed coffee being manually pumped through a filtration assembly to separate the brewed coffee from spent ground coffee.

Once the ground coffee 250 has steeped in hot water 258 for the desired time period, a user applies pressure in a downward direction against the exterior surface 110 and upper surface 112 of the pump assembly 102 as illustrated in FIG. 6. The downward pressure causes the domed region 118 to deform inwardly, thereby applying downward pressure against the hot water 258. The downward pressure applied by the user is also sufficient to overcome the spring forces of the three plate springs, two of three shown as 185a and 185b such that the pressure plate 180 moves in an upward direction relative to the transition portion 168 such that end surface 182 is directed into engagement with the transition portion 168. As the pressure plate 180 moves upwardly, valve spring 204 is compressed resulting in the sealing member 196 being lifted from the lower valve opening 164 so as to allow flow through the central opening 192 and into the coffee mug 252. With a flow channel open to the coffee mug 252, hot water 258 is directed through the ground coffee 250. The ground coffee 250 is retained by the combination of the coarse filter 222 and fine filter 224. Freshly brewed coffee 260 passes through the coarse filter 222, fine filter 224 and apertures 232 whereby the freshly brewed coffee 260 flows through the lower valve opening 164, through the central opening 192 and into the coffee mug 252.

Figure 7:
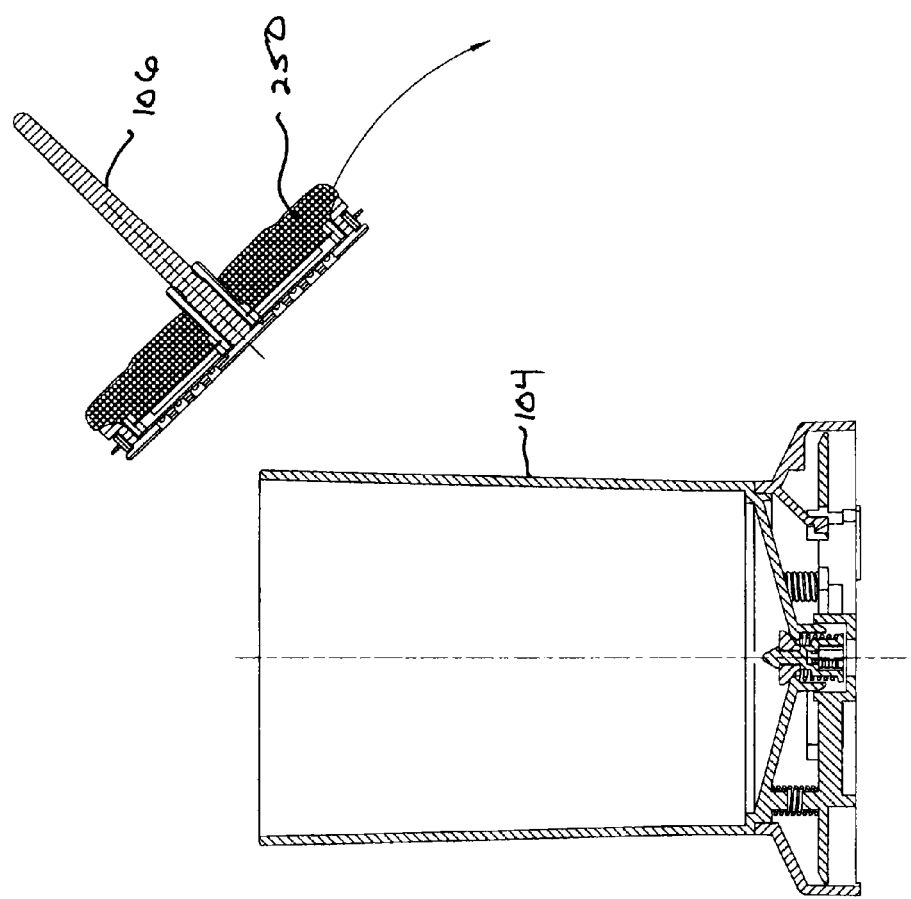
FIG. 7 is a front, section view of the brew chamber assembly of FIG. 3 with spent ground coffee being removed from the brew chamber assembly.

Once the freshly brewed coffee 260 has been collected, the pump coffee brewer 100 can be lifted off of the coffee mug 252. As the engagement of pressure plate 180 and the upper mug surface 254 is terminated, the three plate springs, two of three shown as 185a and 185b return to their noncompressed state such that the pressure plate 180 is moved to the downward position relative to the transition portion 168. With the pressure plate 180 in the downward position, valve spring 204 returns to its noncompressed state such that sealing member 196 engages and closes off the lower valve opening 164. The user then grasps pump assembly 102 and pulls the lower surface 114 out of the chamber opening 155. Once chamber opening 155 is exposed, the user grasps the central mounting post 226 and pulls the filtration assembly 106 out of the brew chamber assembly 104 as shown in FIG. 7. With the filtration assembly 106 removed from the brew chamber assembly 104, the coarse filter 222 and fine filter 224 can be removed from about central mounting post 226 such that the now spent ground coffee 250 as well as fine filter 224 can be discarded. With pressure removed from the pump assembly 102, the domed region 118 of pump assembly 102 returns to its pre-pressurized state such that the only requirement for further utilization of the pump coffee brewer 100 is replacement of the fine filter 224.

Figure 8:
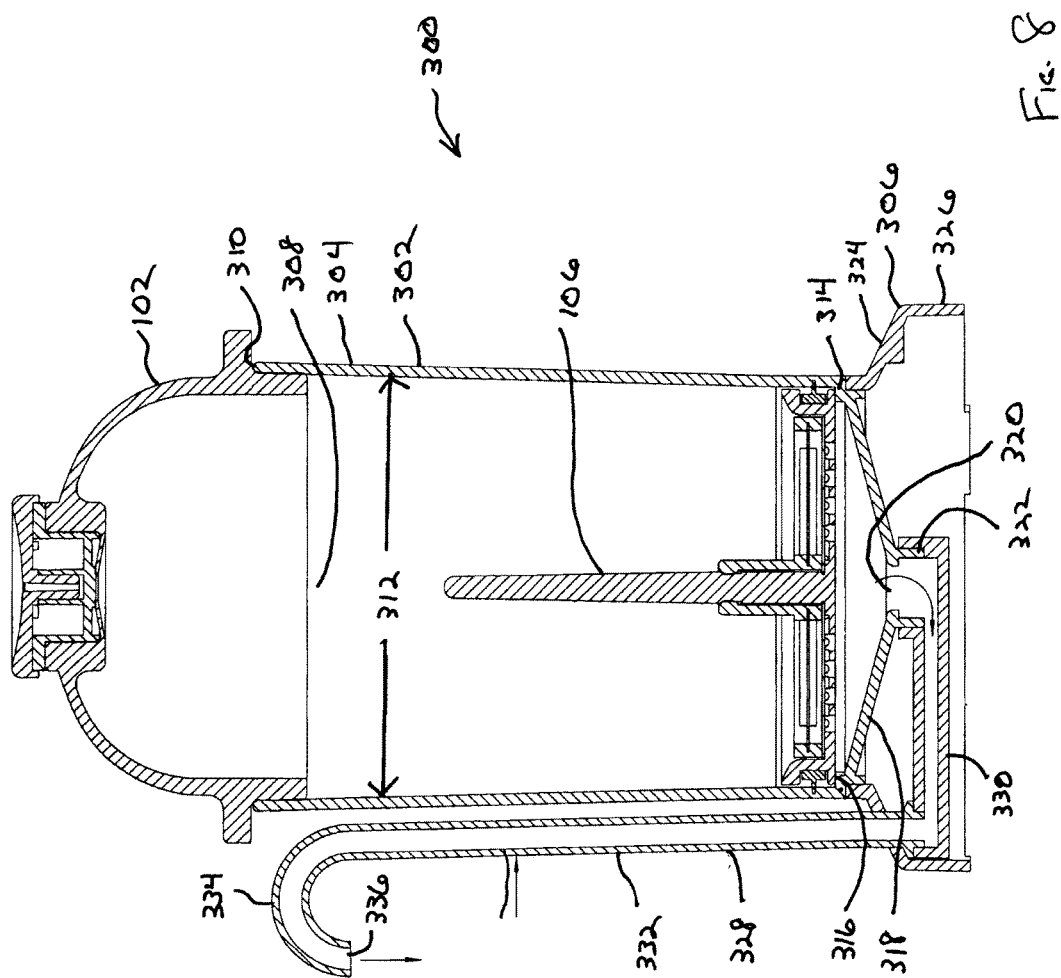
FIG. 8 is a front, section view of a pump coffee brewer according to an alternative embodiment of the present invention.

In an alternative embodiment as illustrated in FIG. 8, a pump coffee brewer 300 can be configured for placement and use directly on a generally flat, hard surface such as a countertop or table. Pump coffee brewer 300 can utilize the same pump assembly 102 and filtration assembly 106 as pump coffee brewer 100 with a design difference being found within a brew chamber assembly 302.

Brew chamber assembly 302 generally comprises a cylindrical body portion 304 and discharge portion 306. Cylindrical body portion 304 defines a chamber opening 308 at a top body surface 310 and includes an inner diameter 312 that is only slightly larger than the lower surface diameter 124. Cylindrical body portion 304 includes a lower engagement surface 314 having an internal perimeter flange 316 and a tapered lower surface 318. Tapered lower surface 318 defines a discharge opening 320 and a projecting wall 322. Discharge portion 306 attaches to the cylindrical body portion 304 and includes a transition portion 324, a perimeter wall 326 and a discharge assembly 328. Discharge assembly 328 includes a discharge tube 330 that is operably coupled to the discharge opening 320 and a discharge spout 332 that extends through the transition portion 324 and projects upwardly in generally parallel relation to the cylindrical body portion 304. Discharge spout 332 includes an uppermost bend region 334 and a spout opening 336. Discharge spout 332 extends upward along the cylindrical body portion 304 such that uppermost bend region 334 is generally located at the same elevation relative to a supporting flat surface (countertop or table) as the top body surface 310. In this manner, sufficient head pressure does not exist within the brew chamber assembly 302 to allow hot water 258 to be prematurely or accidentally directed through the discharge assembly 328 and out the spout opening 336.

The initial operation of pump coffee brewer 300 is substantially similar as that previously described with respect to pump coffee brewer 100. The assembly and attachment of filtration assembly 106, the addition of ground coffee 250 and hot water pump assembly 102 and the attachment and operation of pump assembly 102 are essentially identical to that previously described with respect to pump coffee brewer 100. Once the ground coffee 250 has steeped in hot water 258 for the desired time period, a user applies pressure in a downward direction against the exterior surface 110 and upper surface 112 of the pump assembly 102. The downward pressure causes the domed region 118 to deform inwardly as shown in FIG. 6, thereby applying downward pressure against the hot water 258. This downward pressure is sufficient to force hot water 258 through the ground coffee 250, through the coarse filter 222, through the fine filter 224 and finally through the apertures 232 such that freshly brewed coffee 260 is directed out the discharge opening 320 and into the discharge tube 330. The pressure applied by pump assembly 102 provides enough force to direct the freshly brewed coffee 260 up the discharge spout 332, past the uppermost bend region 334 and out the spout opening 336 where the freshly brewed coffee 260 can be directed into coffee mug 252.

Figure 16:
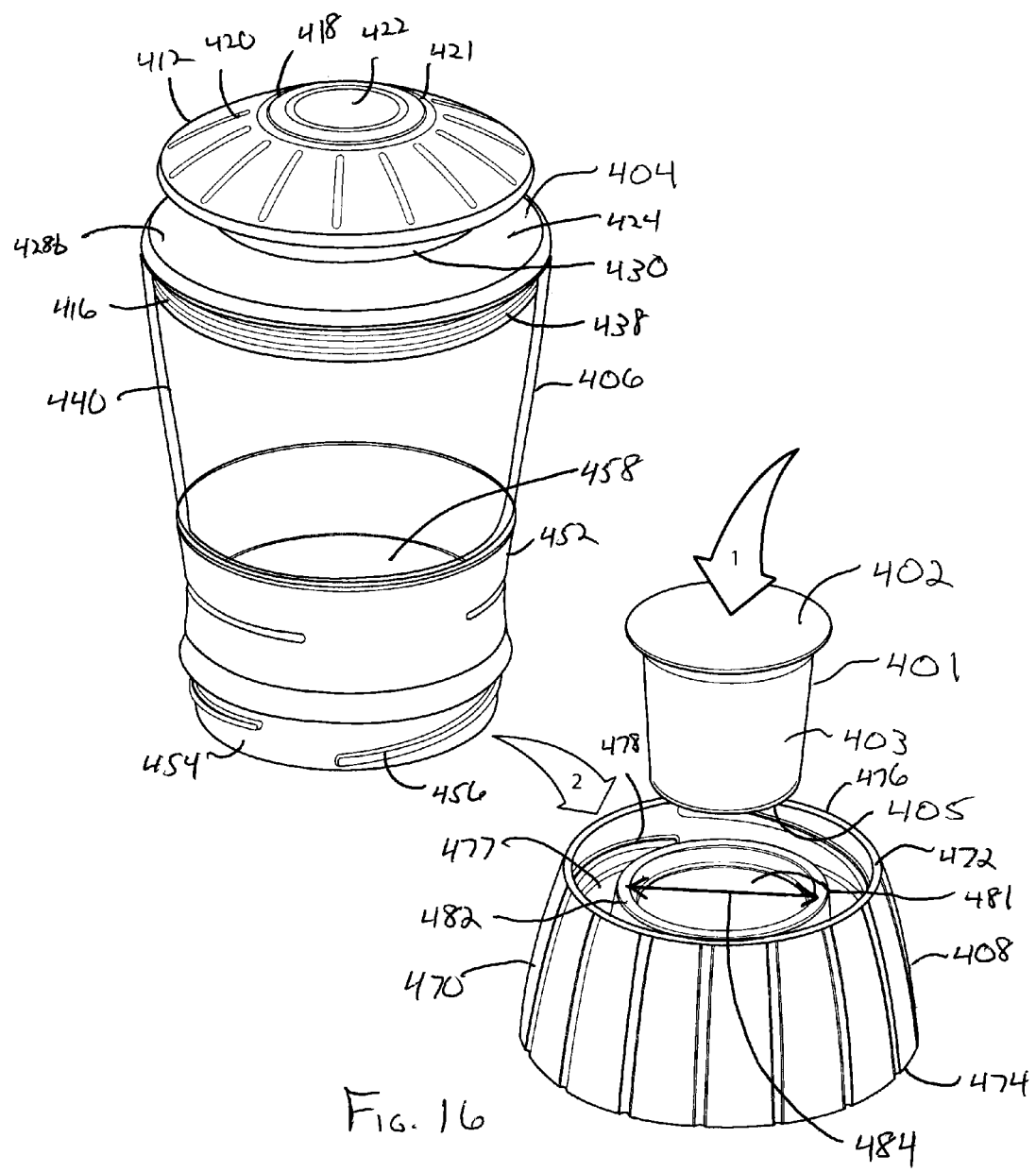
FIG. 16 is an exploded, front perspective view of the manual pump brewer of FIG. 9 being loaded with a prepackaged pod.
Figure 17:
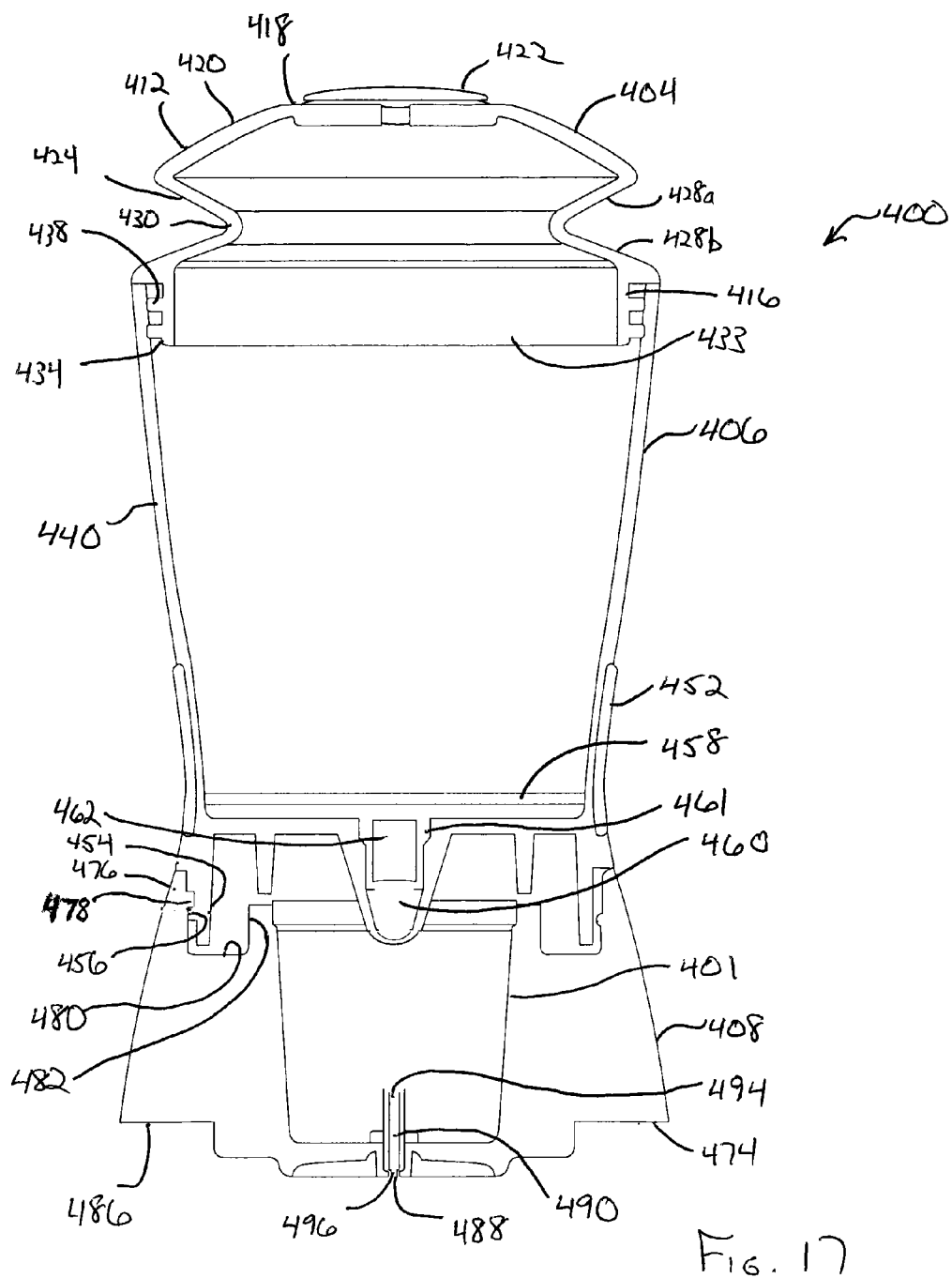
FIG. 17 is a section view of the manual pump brewer of FIG. 9 taken at line 17-17 of FIG. 9 including a prepackaged pod loaded in the manual pump brewer.

Referring now to FIGS. 9-17, another representative embodiment of a manual pump brewer 400 is illustrated for use with an individual pod 401. Individual pod 401 as illustrated in FIGS. 16 and 17 can comprise a K-Cup® pod that generally includes an upper foil surface 402, a cylindrical pod body 403 and a pod bottom surface 405. Alternatively, individual pod 401 can comprise a reusable/refillable pod where a user generally fills the reusable/refillable pod with sufficient amounts of brewing media, such as, for example, ground coffee, hot chocolate powder or tea leaves, to brew or otherwise make a single serving. Generally, the individual pod 401 contains a ground brewing material or mix such as, for example, ground coffee, tea, hot chocolate and the like. By using individual pod 401, a user can quickly brew individual servings using manual pump brewer 400 without the necessity of utilizing and incorporating a filtration assembly or adding the ground brewing material as these functions are incorporated into the individual pod 401.

Figure 9:
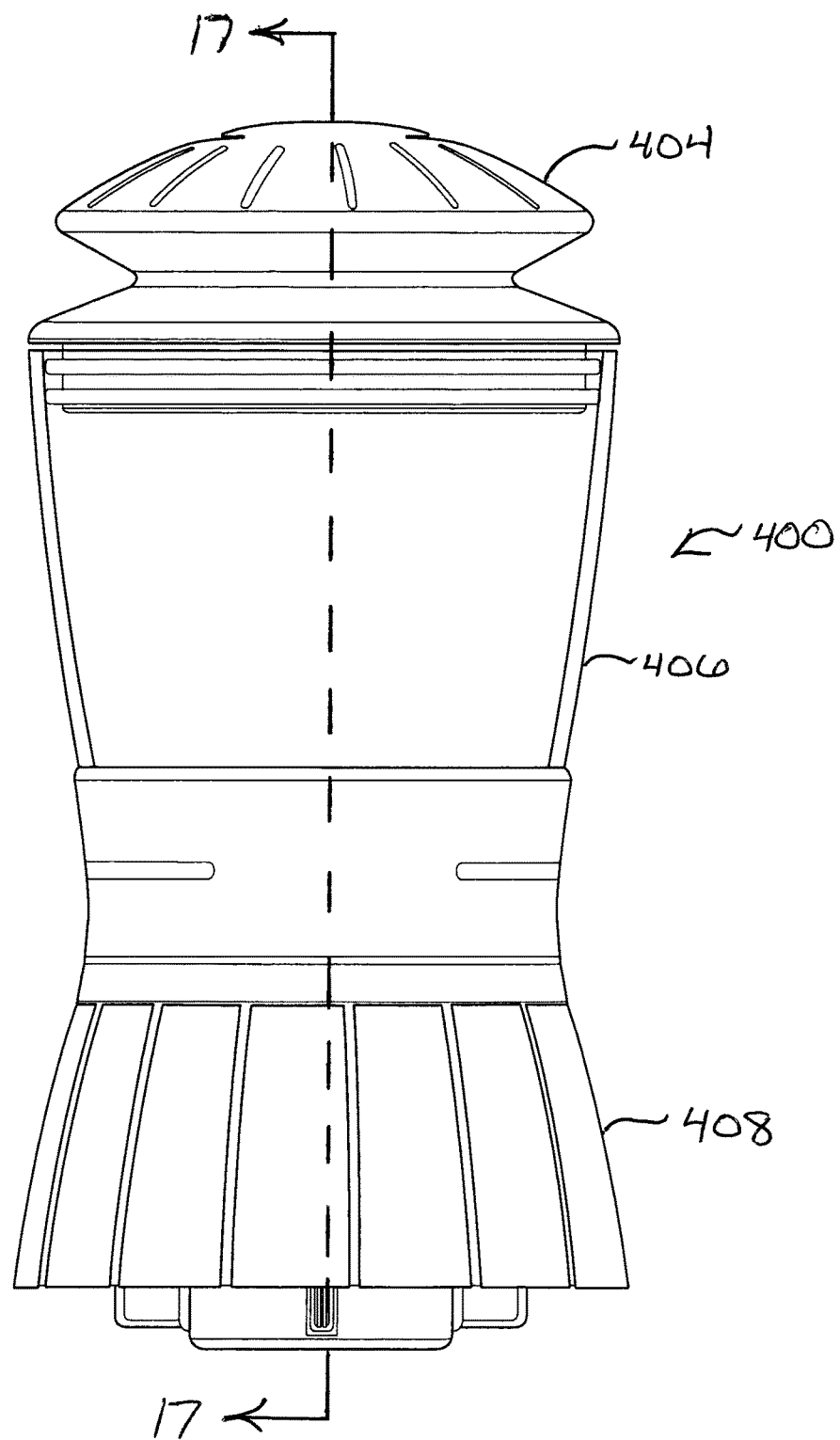
FIG. 9 is a front view of a manual pump brewer according to an embodiment of the present invention.
Figure 10:
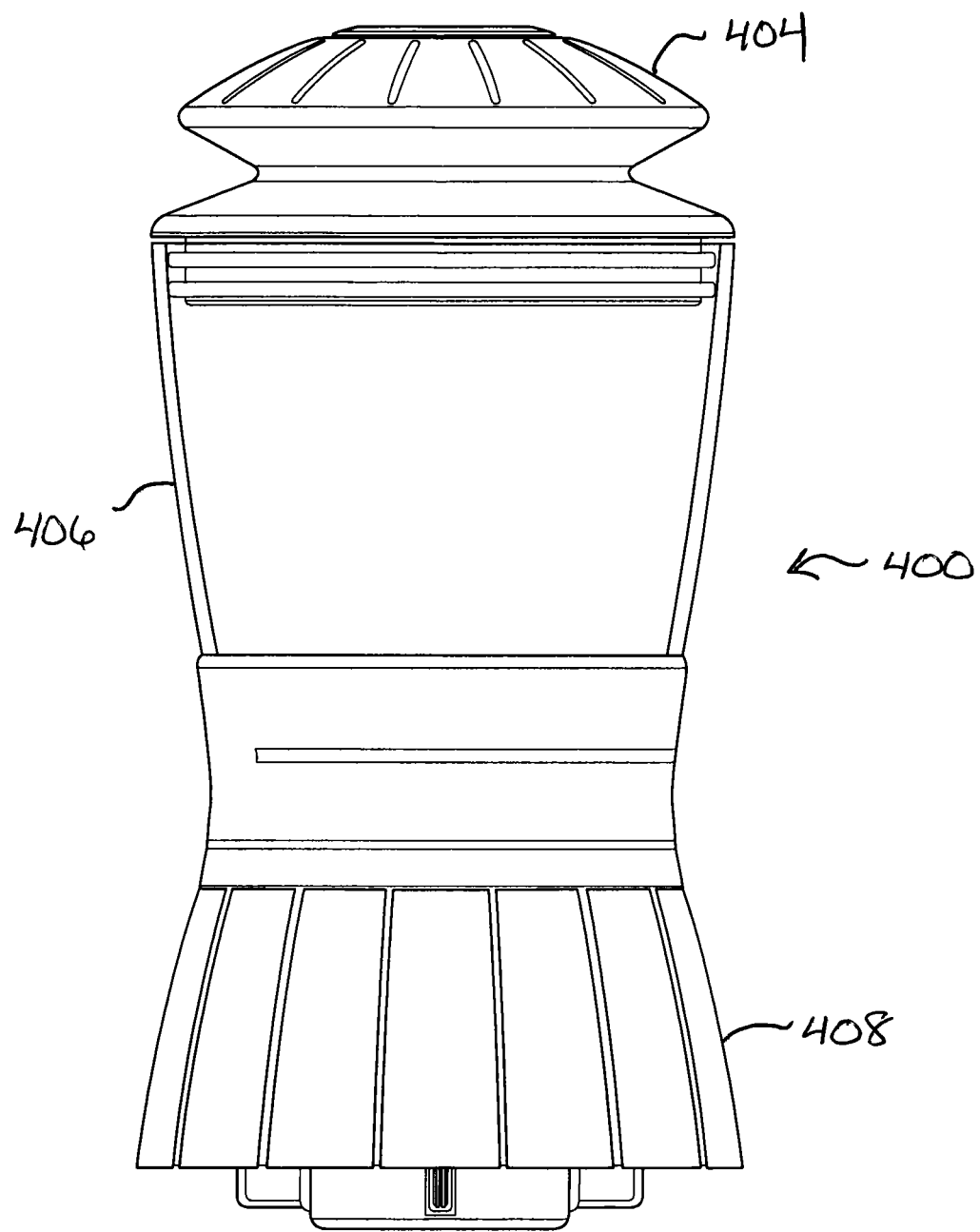
FIG. 10 is a side view of the manual pump brewer of FIG. 9.
Figure 11:
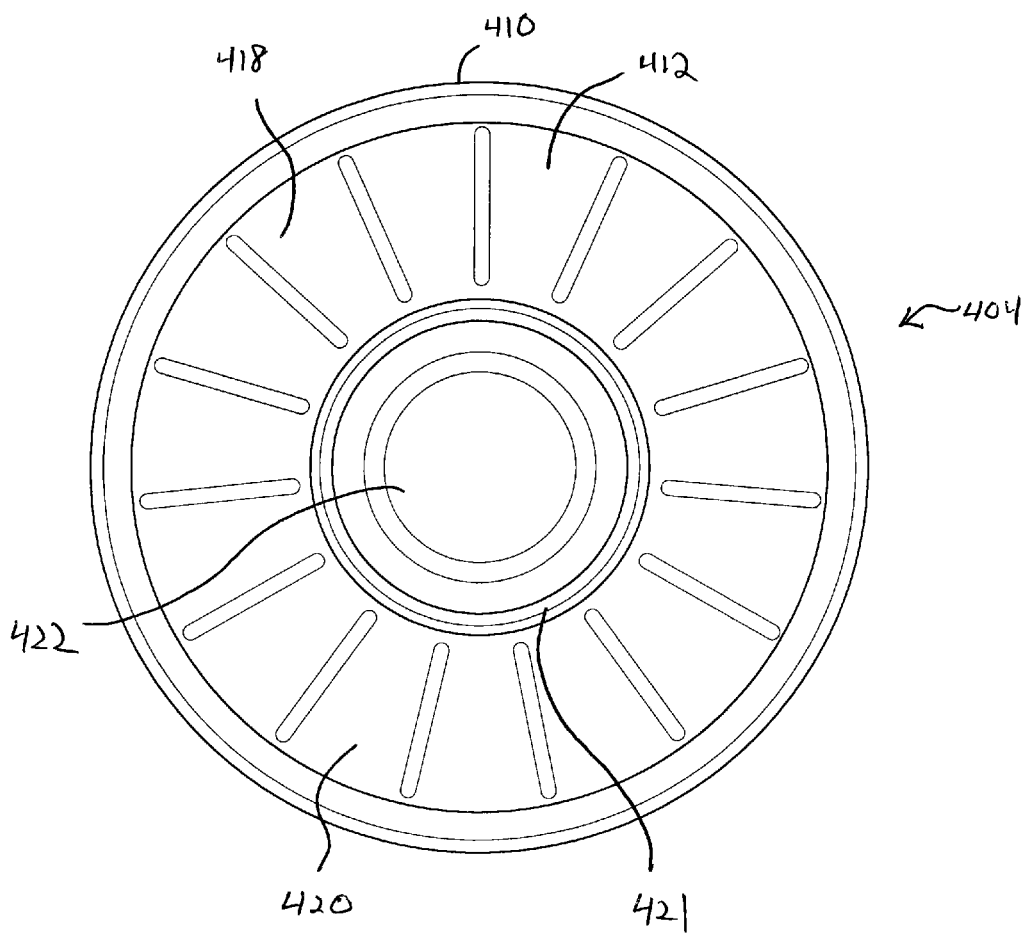
FIG. 11 is a top view of the manual pump brewer of FIG. 9.
Figure 12:
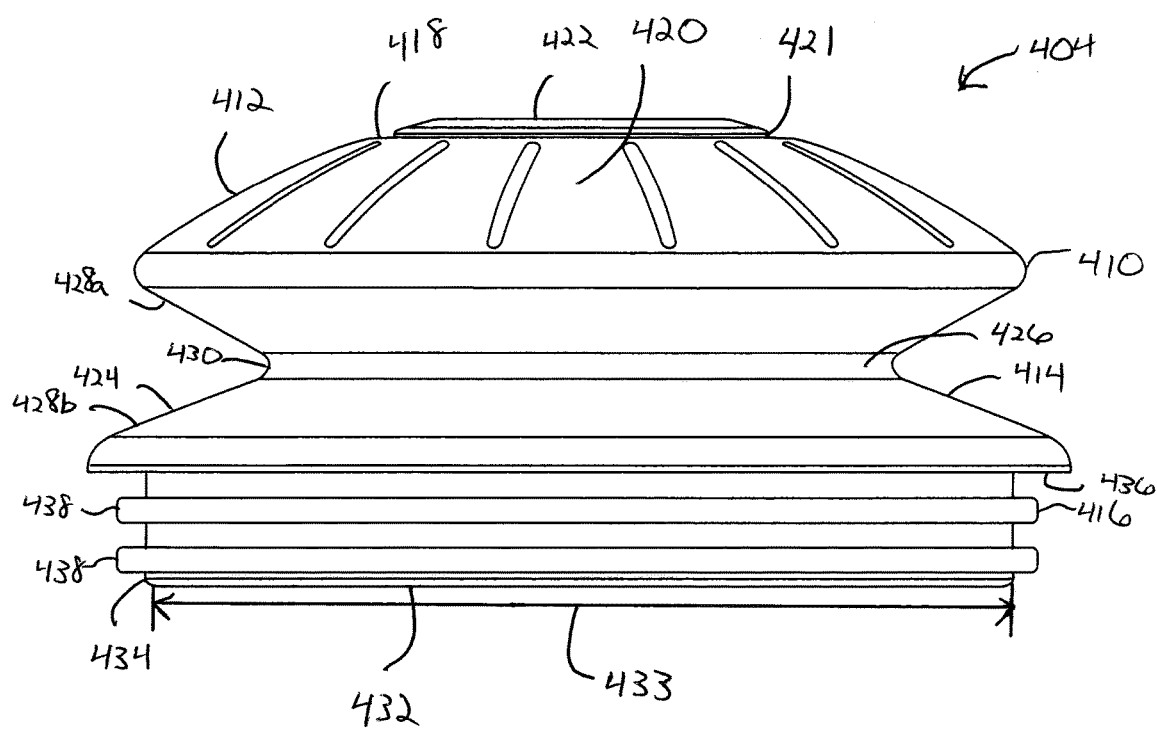
FIG. 12 is a front view of a pump assembly for use with the manual pump brewer of FIG. 9.
Figure 13:
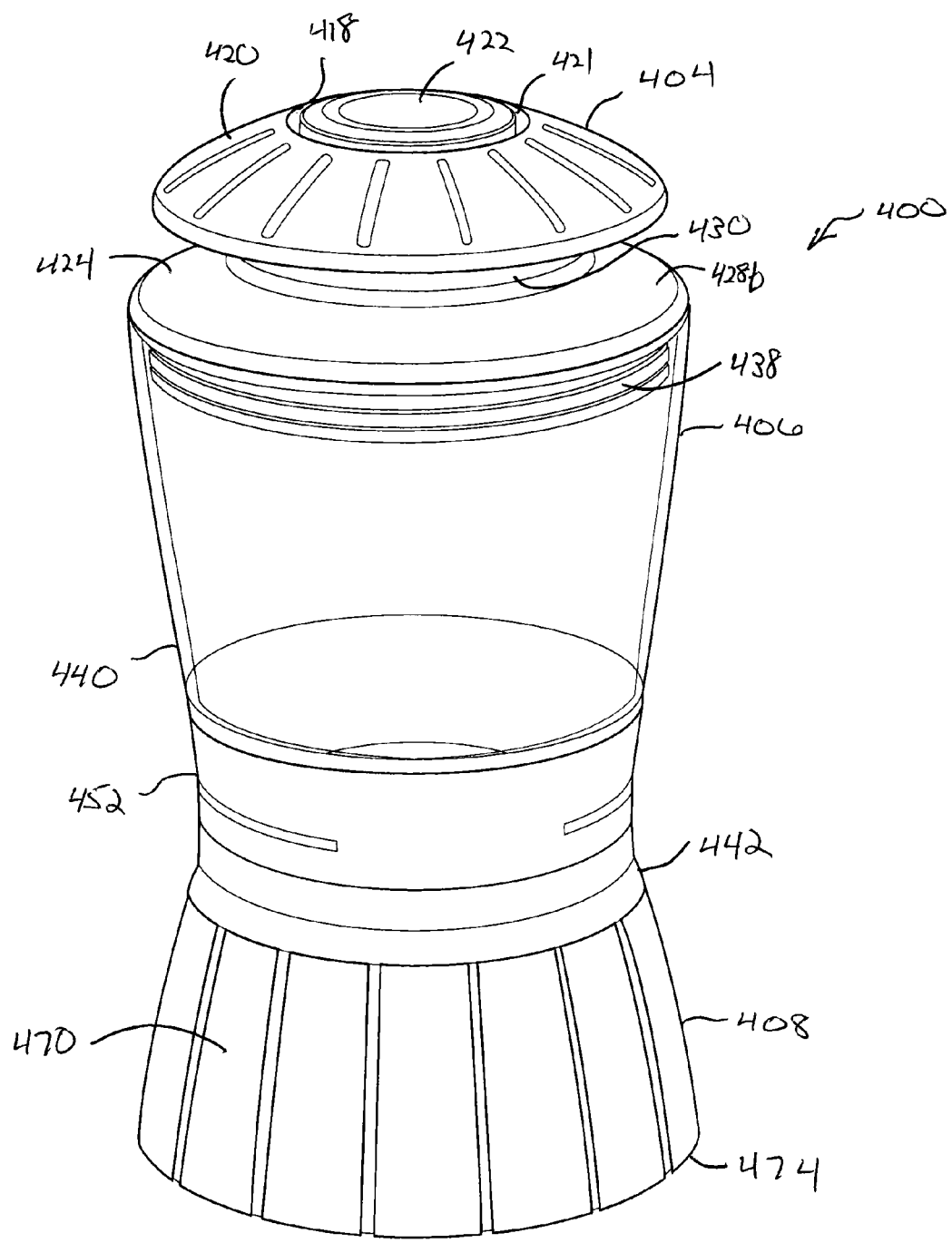
FIG. 13 is a perspective, front view of the manual pump brewer of FIG. 9.
Figure 14:
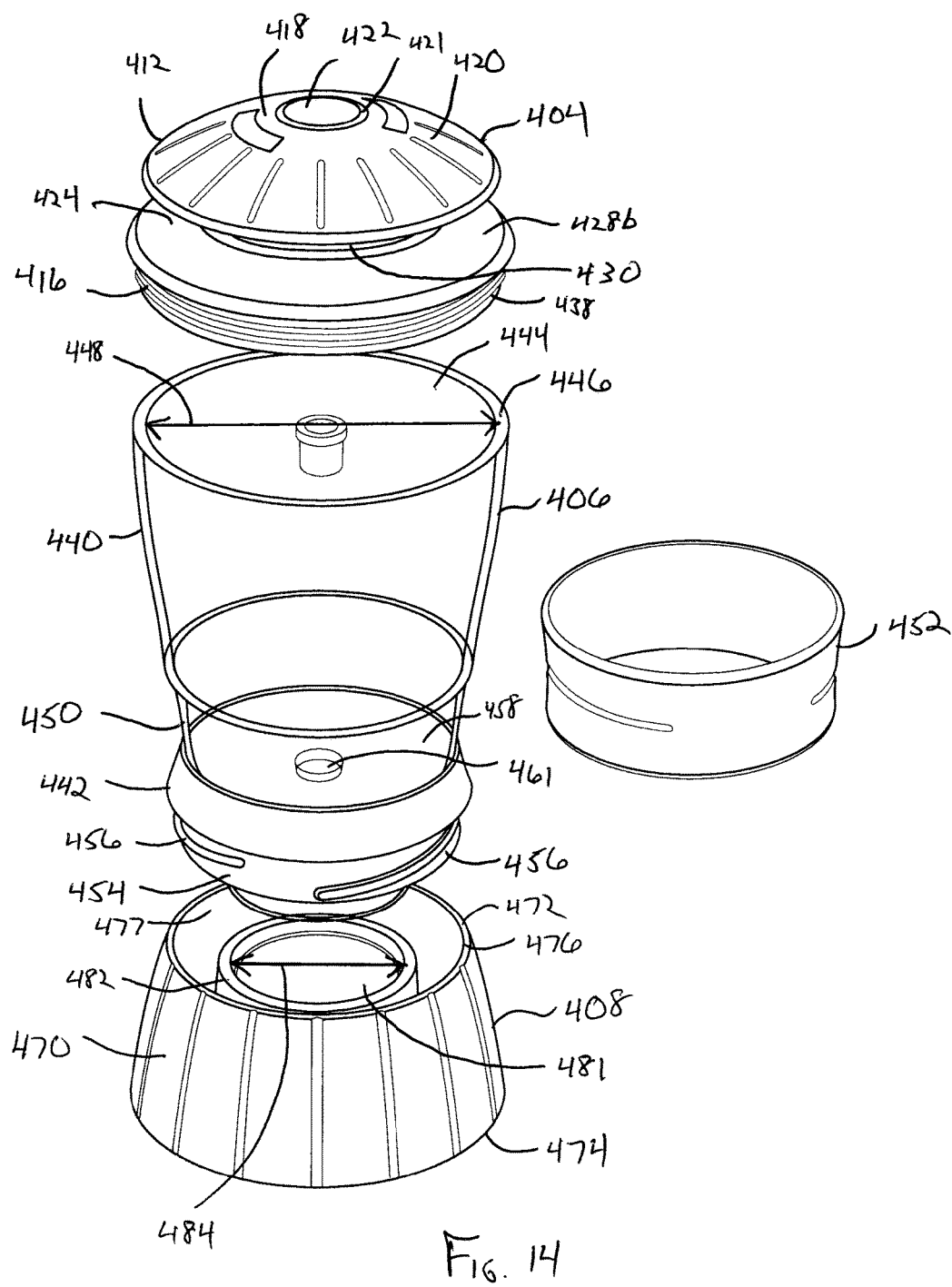
FIG. 14 is an exploded, front perspective view of the manual pump brewer of FIG. 9.
Figure 15:
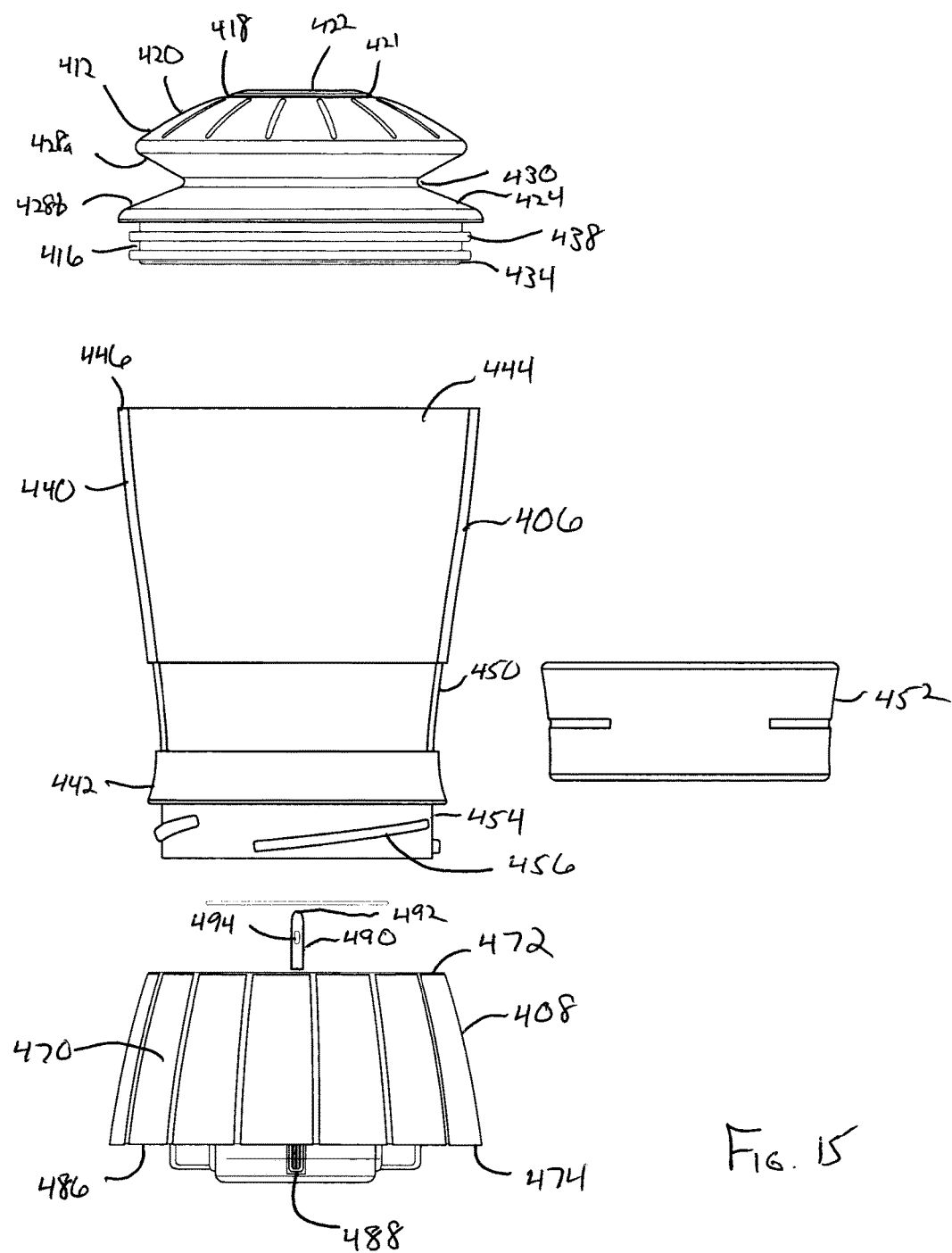
FIG. 15 is an exploded, front view of the manual pump brewer of FIG. 9.

Manual pump brewer 400 can generally comprise a pump assembly 404, a brew chamber assembly 406 and a base assembly 408 as shown in FIGS. 9 and 10. Manual pump brewer 400 is again generally fabricated of materials compatible with food contact as well as the elevated temperatures associated with brewing heated beverages and the temperatures associated with cleaning and sanitizing following the brewing process. More specifically, brew chamber assembly 406 can comprise materials of construction suitable for use inside a microwave, such as, for example, copolyesters such as Tritan® available from the Eastman Chemical Company, for the purpose of providing a container for heating water.

Referring to FIGS. 9-17, pump assembly 404 generally comprises an exterior wall 410 having an upper portion 412, a compressible body portion 414 and a lower portion 416. Pump assembly 404 is generally fabricated of a resilient, deformable material such as, for example, rubber or similar materials suitable for food contact and compatible with conventional cleaning methods. Upper portion 412 generally includes an upper surface 418 that can define a domed region 420. Upper surface 418 generally includes an upper opening 421 in which a pump check valve 422 is mounted. Compressible body portion 414 can comprise at least one compressible section 424. Compressible section 424 can be configured so as to have at least one accordion-like portion 426 having a pair of opposed sloped surface 428a, 428b connecting at an inner junction 430. Lower portion 416 generally defines a lower opening 432 defined within a downward projecting wall 434. The lower opening 432 generally has a lower opening diameter 433. Downward projecting wall 434 extends downward from a lower flanged surface 436 and can include one or more perimeter sealing ribs 438.

Referring to FIGS. 9, 10, and 13-17, brew chamber assembly 406 generally comprises a cylindrical body portion 440 and an interface portion 442. Cylindrical body portion 440 defines a chamber opening 444 defined at a top body surface 446 and includes an inner diameter 448 that is only slightly larger than the lower opening diameter 433. Cylindrical body portion 440 can include an indented portion 450 upon which an insulated sleeve 452 is mounted. Interface portion 442 includes a cylindrical projection 454 including external threads 456. Interface portion 442 further defines a body floor 458 having a generally centrally located, downwardly facing cone 460 having a cone aperture 461. Mounted within downwardly facing cone 460 is a check valve 462.

Base assembly 408 is illustrated generally in FIGS. 9, 10 and 13-17. Base assembly 408 includes a base member 470 having an upper base surface 472 and a lower base surface 474. Upper base surface 472 includes a base wall 476 that defines an upper base opening 477. Base wall 476 includes one or more internal threads 478. Upper base surface 472 defines a base floor 480 having a pod receiving cavity 481. Pod receiving cavity 481 is defined by a pod cavity wall 482 that extends upward from base floor 480. Pod receiving cavity 481 defines a pod internal diameter 484 that is selected to accommodate the insertion of commercially available pods 401. Lower base surface 474 defines a perimeter flange 486 and a generally centrally located aperture 488 that extends between the lower base surface 474 and the pod receiving cavity 481. Mounted within the centrally located aperture 488 is a hollow pin 490 having a sharpened tip 492, a tip aperture 494 and a dispensing aperture 496.

To use manual pump brewer 400, a user generally fills the brew chamber assembly 406 with a heated beverage such as, for example, hot water or milk. In some instances, this can involve pouring the heated beverage directly into the brew chamber assembly 406, though in one preferred embodiment, a user can fill the brew chamber assembly 406 with an unheated beverage and directly place the filled brew chamber assembly 406 in a microwave oven for a period of time suitable for heating the beverage. The user can grab the brew chamber assembly 406 using insulated sleeve 452 such that the user is not exposed to elevated temperatures that would otherwise be conducted from the heated beverage. For purposes of the following discussion, the use of manual pump brewer 400 will be described with respect to using heated water to brew coffee though it will be understood that similar beverages can be similarly utilized such as, for example, using heated milk to brew hot chocolate.

Once the brew chamber 406 is filled with heated water, the user attaches the pump assembly 404 to the brew chamber assembly 406. The user generally directs the downward projecting wall 434 into the chamber opening 444 until the lower flanged surface 436 contacts the top body surface 446. As the downward projecting wall 434 enters the chamber opening 444, the one or more perimeter sealing ribs 438 are forced into contact with and seal against the cylindrical body portion 440.

Prior to attaching the brew chamber 406 to the base assembly 408, the user positions individual pod 401 in the pod receiving cavity 481. Next the user begins rotatably inserting the cylindrical projection 454 into the upper base opening 477 causing the external threads 456 to engage with the internal threads 478. In the case of individual pod 401 comprising a prepackaged pod, the user continues the rotatable coupling of the brew chamber 406 and the base assembly 408, the downwardly facing cone 460 is forced into contact with the upper foil surface 402 until finally, the downwardly facing cone 460 pierces the upper foil surface 402 such that the cone aperture 461 is in fluid communication with the inside of pod 401. At the same time, the body floor 458 comes into contact with the pod body 403 such that the pod bottom surface 405 is forced into contact with the sharpened tip 492 of hollow pin 490 such that the hollow pin 490 ultimately pierces the pod bottom surface 405. When individual pod 401 comprises a reusable/refillable pod, downwardly facing cone 460 may enter into an upper aperture on the reusable/refillable pod and the sharpened tip 492 may enter into a lower aperture on the reusable/refillable pod. Alternatively, certain designs of a reusable/refillable pod may allow for operation without hollow pin 490.

With the brew chamber 406 fully coupled to the base assembly 408, the user positions the manual pump brewer 400 over a cup such as, for example, a coffee mug. The lower base surface 474 sits directly on the rim of the coffee mug while the centrally located aperture 488 is positioned within the top opening of the coffee mug. The user then pressurizes the heated water by pressing downward upon the upper surface 418 of the pump assembly 404. As the dome region 420 is compressed, any air within the pump assembly 404 and brew chamber 406 is pressurized, thereby causing the check valve 462 to open such that the heated water is forced through the cone aperture 461 and into the pod 401. The heated water is forced through the brewing material and filter that are self-contained within the individual pod 401 such that a brewed fluid is forced out of the individual pod 401 through tip aperture 494. The brewed fluid traverses the hollow pin 490 and is forced out the dispensing aperture 496 and into the coffee mug. The user can release the pump assembly 404, such that the compressible section 424 can return to its original domed configuration. As the pump assembly 404 returns to its domed configuration, the pump check valve 422 releases any vacuum that has been formed inside the manual pump brewer 400. Depending upon the amount of heated water contained in the brew chamber assembly 406, it may be necessary to compress and release the pump assembly 404 two or more times to direct the entire volume of heated water through the pod 401.

Although specific examples have been illustrated and described herein, it will be appreciated by those of ordinary skill in the art that any arrangement calculated to achieve the same purpose could be substituted for the specific examples shown. This application is intended to cover adaptations or variations of the present subject matter. Therefore, it is intended that the invention be defined by the attached claims and their legal equivalents.

The invention claimed is:

1. A beverage brewer, comprising:
a pump assembly having a deformable exterior wall;
a brew chamber assembly for retaining a liquid, the brew chamber assembly including an interface portion defining a downward facing cone having a check valve mounted therein; and
a base assembly for receiving an individual pod, the base assembly including a lower base surface having a central aperture, the aperture having a hollow, upward pin mounted therein,
wherein manually engaging the brew chamber assembly with the base assembly causes the downward facing cone to pierce an upper surface of the individual pod and fluidly engage an inside portion of the individual pod while the hollow, upward pin engages the inside portion through a lower surface of the individual pod, and
wherein application of external pressure to said deformable exterior wall generates pressure sufficient to overcome the check valve within said downward facing cone such that said liquid is directed through the downward facing cone and into the individual pod and a finished beverage exits the individual pod.

2. The beverage brewer of claim 1, wherein the interface portion includes external threads and the base assembly includes a base wall with internal threads and wherein the external and internal threads are rotatably coupled to engage brew chamber assembly and the base assembly.

3. The beverage brewer of claim 2, wherein the individual pod comprises a prepackaged pod and the downward facing cone punctures an upper foil surface on the prepackaged pod as the brew chamber rotatably engages the base assembly.

4. The beverage brewer of claim 1, wherein the pump assembly includes an air valve mounted in said deformable exterior wall, said air valve opening in response to a vacuum condition within the brew chamber assembly such that the brew chamber assembly is vented to atmosphere.

5. The beverage brewer of claim 1, wherein the lower base surface having a perimeter flange to engage an upper mug surface of a cup or mug.

6. The beverage brewer of claim 1, wherein the base assembly includes a base floor defining a pod receiving cavity, wherein said central aperture is in communication with the pod receiving cavity.

7. The beverage brewer of claim 6, wherein the individual pod comprises a prepackaged pod that is positioned in the pod receiving cavity such that the hollow pin pierces a pod bottom surface and the brewed beverage is dispensed through the central aperture.

8. The beverage brewer of claim 1, wherein the brew chamber assembly rotatably interconnects to the base assembly.

9. The beverage brewer of claim 1, wherein the brew chamber assembly comprises a microwave compatible material such that the brew chamber assembly can be positioned within a microwave oven for heating a liquid.

10. The beverage brewer of claim 1, wherein the brew chamber assembly includes a cylindrical body portion having an indented portion wherein an insulated sleeve is positioned over the indented portion.

11. The beverage brewer of claim 1, wherein the individual pod comprises a reusable pod.

12. A method for brewing a beverage, comprising:
filling a brew chamber assembly with liquid, the brew chamber assembly including an interface portion having a downward facing cone, said downward cone including a check valve mounted therein;
attaching a manual pump assembly to the brew chamber assembly;
positioning an individual pod in a pod receiving cavity on a base assembly, the base assembly including a hollow upward pin mounted within a central aperture wherein the central aperture is in fluid communication with the pod receiving cavity;
attaching the brew chamber assembly to the base assembly, whereby the downward facing cone pierces an upper surface of the individual pod and fluidly engages an inside portion of the individual pod while the hollow upward pin engages the inside portion through a lower surface;
deforming the manual pump assembly to generate sufficient pressure within the brew chamber assembly to overcome the check valve such that the liquid is directed through the downward facing cone and into the individual pod to create a brewed beverage.

13. The method of claim 12, wherein the interface portion includes external threads and the base assembly includes a base wall with internal threads, wherein the step of attaching the brew chamber assembly to the base assembly further comprises:
engaging the external and internal threads to rotatably couple the brew chamber assembly with the base assembly.

14. The method of claim 13, wherein the individual pod comprises a prepackaged pod, the method further comprising:
piercing an upper foil surface on the prepackaged pod with the downward facing cone on the brew chamber assembly.

15. The method of claim 14, further comprising:
piercing a pod bottom surface of the prepackaged pod.

16. The method of claim 13, further comprising:
positioning a cup or mug below the base assembly such that the brewed beverage is directed into the cup or mug.

17. The method of claim 12, further comprising:
placing the filled brew chamber in a microwave oven; and heating the liquid contained within the brew chamber assembly.

18. The method of claim 12, wherein the individual pod comprises a reusable pod.

* * * * *